May 6, 1947.  R. H. OSTERGREN  2,420,148
PRESSURE INDICATOR
Filed Nov. 8, 1943
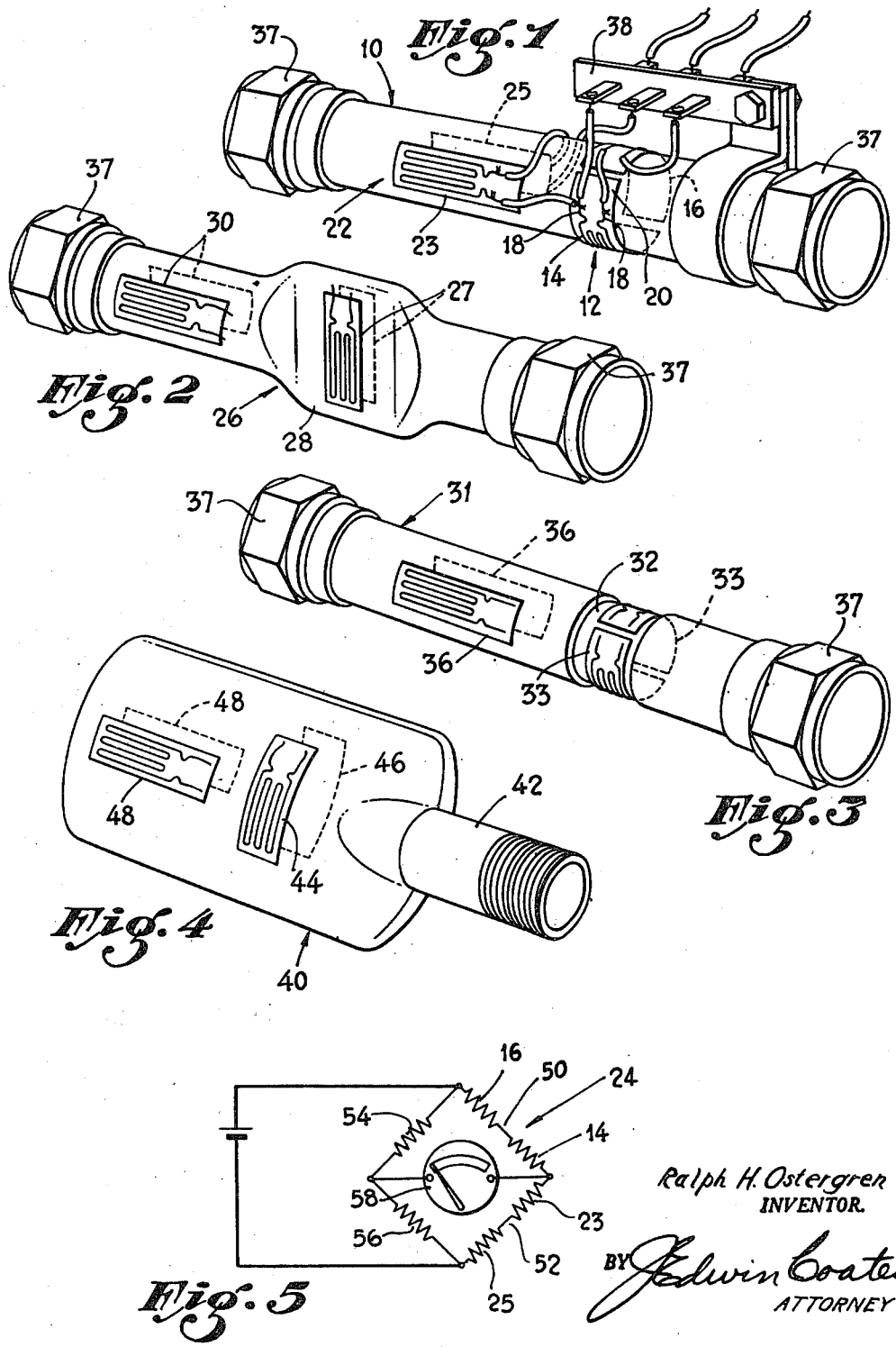
Ralph H. Ostergren
INVENTOR.
BY Edwin Coates
ATTORNEY Patented May 6, 1947

2,420,148

UNITED STATES PATENT OFFICE 2,420,148

PRESSURE INDICATOR

Ralph H. Ostergren, Los Angeles, Calif., assignor to Douglas Aircraft Company, Inc., Santa Monica, Calif.

Application November 8, 1943, Serial No. 509,531

5 Claims. (Cl. 177—351)

This invention relates to pressure indicators, and employs the relationship of increase in the electrical resistance of a fine filament of conductive material to the increase in tension therein, to indicate with accuracy the pressure of substances or fluids or gases acting on the walls of containing structures such as tanks or pipes, by recording the strain caused by increase of diameter, in the case of pipes, due to the pressure in the pipe. While the phenomenon of variation in resistance of most metals with variation of strain is well known, the utilization thereof in the manner herein disclosed is believed to be novel.

According to this invention, use is made of an indicator which is made from a length of resistance wire preferably in the form of a grid of the wire cemented to a backing of thin flexible material. Such an indicator is made by the winding machine forming the subject matter of U. S. patent application Serial No. 496,231 by Van Dyke. One of these indicators is cemented to the surface of the containing structure to register and indicate the amount of deformation of the part of the containing structure on which it is mounted, thereby enabling the value of the pressure causing the deformation to be determined.

In order to find the pressure acting in a hydraulic system it may be desirable to determine this pressure at various points. For this purpose it has previously been necessary to either insert in a pipe line a length of pipe having fitted therein a pressure recording instrument, which frequently was unsatisfactory since the point at which it was desired to ascertain the pressure might not be adjacent a joint in the pipe, or to drill a hole in the pipe at the desired point, tap a screw thread in the side of the hole, and mount a pressure indicating instrument, which after use would be removed and the hole plugged up.

The tubing used in airplanes is naturally as light as can be used to carry the necessary pressures. For example, most of the hydraulic tubing which has to withstand pressures of from 1000 to 3000 lbs. per square inch varies in size from ¾ to ¼ inch diameter and from 32 to 50 thousandths of an inch in thickness. The pipe lines are installed with as few joints as possible for obvious reasons.

This type of tubing lends itself particularly well to the use of the pressure indicating means of this invention and the invention is particularly valuable in airplane work because of the importance of careful determination of the strength of all parts of the hydraulic system, the failure of which can easily involve loss of the plane.

The instrument of this invention, in the specific embodiment described, is shown applied to a comparatively thin walled tubing containing hydraulic fluid under high pressure. The sensitivity of the instrument is such, however, that it can be used on thick walled containers, or on containers or tubing under comparatively low pressures, such as pressure air lines.

It has been found that indicators of the kind described are very sensitive and convenient to use under circumstances in which use of the usual forms of pressure indicator would involve considerable trouble and expense. This is particularly the case when measuring pressures in pipes or containers having a continuous surface, such for instance as pressure tanks or accumulators, since it has hitherto been necessary to bore through the surface of the pipe or container unless it is possible to use existing apertures normally occupied by other apparatus or specially provided plugged bores.

The pressure indicating device of this invention is applicable to any purpose for which the usual Bourdon tube type or other known type of pressure recording instrument is used, but in addition has the advantage that fluctuations in pressure of any frequency can be followed, for example the fluctuations in pressure at a rapidly operating valve, or of several pumps driven by separate motors which may vary constantly, though minutely, relatively to each other in their power output or phase relation, thus causing undesirable pulsations in a common pump high pressure line. Since the recording means associated with the pressure indicators are electrical, it is evident that permanent records can be made of fluctuations of any frequency, and by impressing signals indicating time intervals of the records, the working of an apparatus under dynamic loads can be studied and any necessary corrective measures taken. Many such investigations would be difficult or impossible to carry out with known types of pressure recorders.

An object of the invention is to provide a sensitive and accurate, yet inexpensive pressure indicator comprising a length of fine resistance wire put under tension by the distortion of a length of specially formed pipe or other container by the pressure within the container or pipe.

A further object of the invention is to provide a pressure indicator for measuring pressures in pipes which is compensated for errors arising from bending of the pipe.

A further object of the invention is to provide a method of measuring pressures which is simple yet accurate in operation.

A still further object of the invention is to provide means of unusual sensitivity and accuracy for measuring pressures involving a short length of pipe deformed in such a way that it will yield under pressure to a greater degree than if undistorted and inserting the length of pipe so arranged in the pipe line.

Further objects and features of the invention may hereinafter appear from the following description and accompanying drawings.

It is pointed out that the scope of the invention is not limited by the embodiments herein described and illustrated but only as defined by the appended claims.

In the drawings in which identical numbers indicate identical parts,

Figure 1 is a perspective view showing the pressure indicator mounted in position on a part of a high pressure hydraulic line.

Figure 2 is a perspective view showing the pressure indicator mounted on a length of tube flattened to increase the sensitivity of the gauge.

Figure 3 is a perspective view showing the pressure indicator mounted on a length of tube having the thickness of the wall reduced to increase sensitivity.

Figure 4 is a view showing a form of pressure indicator adapted for use with comparatively low pressures combining the features of the forms shown in Figures 2 and 3.

Figure 5 is a view showing the manner of connecting the pressure indicator in an electrical bridge circuit including an indicator.

Referring to Figure 1 the numeral 10 indicates a short length of tube in a pipe line of a hydraulic system, to which the pressure indicator of this invention is shown applied. The indicator comprises, in addition to the tube length 10, a strain responsive member 12, two elements 14 and 16 of which are preferably applied to opposite sides of the pipe. While the member 12 may be a single element made long enough to wrap around the tube, I prefer to use the two separate elements 14 and 16 applied to opposite sides of the tube.

Each of the elements 14 and 16 is a filament arrangement of the type having a continuous length of resistance wire of small diameter wound in the form of a grid having parallel lengths of wire series connected at their ends by small loops with the end lengths of the grid preferably connected to lead wires 18 for attachment to the electrical indicating means later described. The grid is mounted on a thin flexible backing sheet 20, such as a piece of rice paper, and is cemented thereto throughout its extent, including the point of attachment of the resistance wire to the leads. The backing sheet is cemented to the tube in the direction of stress in the tube wall due to internal fluid pressure and transverse to the longitudinal axis of the tube.

Since the instrument is extremely sensitive, possible sources of error due to pickup of stress due to differences in temperature or to bending of the tube should be eliminated. This is accomplished by providing a second strain responsive member 22 comprising two elements 23 and 25 arranged parallel to the axis of the tube and each positioned adjacent one of the elements 14 and 16 which extend in the direction of stress in the tube length 10 due to internal pressure and transverse to the longitudinal axis of the pipe. The member 22 is so connected in an electrical indicating circuit 24 as to cancel out errors due to bending of the tube section transversely of the direction of stress, since the resistance of the grid on the outside of the bend will be increased while the resistance of the grid on the inside of the bend will be decreased. The elements serving to supply this correction are positioned adjacent the elements 14 to 16 which are sensitive to pressure strain and because of this adjacency will be at the same temperature.

The small reduction in length of the piece of tube 10 due to the increase of the peripheral dimension of the tube (known as the Poisson effect) will increase the resistance of the longitudinally arranged element 22, but the reduction in sensitivity due to this cause is less than 50% leaving ample sensitivity for accurate measurement. Instruments of this form can accurately follow the most rapid fluctuations in pressure such, for instance, as fluctuations of pressure at a check valve in a pneumatically operated riveting machine, and can detect variations of pressure of a pound or two in a pipe line carrying more than 1000 lbs. pressure.

Some tubing sizes for carrying pressure are of small diameter, ¼ inch and less, and it may be easier to wind the resistance wire directly upon and around the surface of such small tubing in the case of the indicator member arranged transversely of the longitudinal axis of the tube. But the one or more elements of the member arranged longitudinally of the axis to correct for bending of the tube can include a flexible backing for a grid of the resistance wire, this backing being in turn cemented to the surface of the tube as previously described, two such elements being mounted on opposite sides of the tube.

Referring now to the form of the invention shown in Figure 2, which is particularly designed for the measurement of low pressures of the order of 100 lbs., the instrument preferably includes a length of tube 26 formed to yield readily to pressure. As illustrated this is accomplished by flattening a length 28 of the tube 26 on which pressure responsive elements 27 are mounted. The action of pressure within the flattened portion of the tube is to increase to a greater degree per pound of pressure, than in the tubular form of the instrument, the deformation of the flattened tube from its normal shape. Flattening the tube, therefore, increases the sensitivity of the device. Elements 30, mounted along the longitudinal axis of the tube to detect and correct for bending of the tube, can be applied on an unflattened portion of the tube.

In Figure 3 another form of extra sensitive instrument is shown. In this form additional distortion of the member on which the strain sensitive member is mounted as compared with the usual type of instrument is obtained by reducing the wall thickness of a portion 32 of a tube length 31 on which pressure sensitive elements 33 are mounted. Elements 36 serving to detect and correct for bending stresses, by cancelling out increase of resistance due to this cause, may be mounted on a portion of the wall of unreduced thickness.

The lengths of tube described with reference to the forms of the invention illustrated in Figures 1 to 3 inclusive can be made up with the usual bell mouth ends and furnished with coupling nuts 37 to facilitate insertion in a hydraulic line. A terminal strip 38 can be mounted on the tube section 10 with the leads 18 from the resistance wire grids soldered to the terminals as shown in Figure 1 to facilitate connection to the electrical indicating apparatus.

Another form of this arrangement of flattened tube is shown in Figure 4. A tube section 40 of considerable diameter and thickness is turned down and flattened to a quasi-elliptical section intermediate its ends, the ends being then welded together, and a union 42 being fitted at one end. This pressure indicator can then be mounted on a T fitting inserted in the line. Pressure indicating grids 44, 46 are mounted on the flattened sides of the tube section 40 with correction grids 48 mounted at right angles thereto.

It is pointed out that in all forms of the invention described the instruments may be mounted, if desired, on T fittings connected in the length of tubing, the open end of the tube sections 10, 26 and 31 being closed by a plug.

In Figure 5 a wiring diagram is shown of the preferred manner of electrically connecting the parts of an instrument of the type having two resistance grids arranged transverse to the longitudinal axis of the tube and two grids arranged longitudinally of the grid.

The pressure indicating resistance wire grids 16 and 14 are connected in series and form one arm 50 of the four arms of a circuit 24 of the usual Wheatstone bridge type. The correction resistance wire grids 23 and 25 are also connected in series and form a second arm 52 of the circuit 24, the arms 50 and 52 forming one side of the circuit, the other side of which is formed by standard resistances 54 and 56. The indicating instrument 58 as connected across the midpoint of the two sides of the bridge may be of any suitable type.

A pressure indicating instrument of this invention is first calibrated by means of a master gauge, which of course may be another previously calibrated instrument of this invention or a conventional pressure gauge. After mounting the calibrated pressure indicating instrument in position the arms 50 and 52 are brought to a state of balance by adjustment of the standard resistances 54 and 56 to cause needle 58 to read 0.

Pressures can be recorded, by the use of the instrument of my invention, during operation of a mechanism, for instance to record the pressures acting in the oleo cylinders of landing gear of planes while the plane is actually landing, or to check on the correct functioning of pressure regulating valves during working of a machine controlled by such valves, the resistance grids of the pressure gauge being positioned directly on the surface of the plane part without in any way disturbing the functioning of the part. The plane part thus becomes a part of the pressure gauge.

It is believed to be apparent that the pressure gauge of this invention provides a valuable advance in the art and is of great usefulness in a very wide field.

I claim:

1. A pressure indicator for measuring pressure variations in a hollow body comprising: a length of tube having a portion thereof formed to yield or distort to a greater degree than said body under internal pressure; means for connecting said tube to said body so that said tube is responsive to variations in pressure within said body; a length of fine resistance wire wound into a grid formed as a plurality of closely spaced parallel lengths of wire, each pair of wires forming at one end small loops at alternately opposite ends of the grid; a backing of thin non-conductive material to which the grid is cemented throughout its extent, the backing being cemented throughout its extent to the surface of said tube so that the lengths of wire lie in the direction of strain of the material under the action of pressure acting within said tube and transversely to the longitudinal axis of the tube; a second length of resistance wire formed into a grid mounted on a backing similarly to said first mentioned grid and similarly mounted on the length of tube, the grids being arranged on opposite sides of said tube; a third length of fine resistance wire wound into a grid cemented to a backing similarly to said first mentioned grid and mounted on the tube exterior surface adjacent but at right angles to said first mentioned grid; a fourth length of fine resistance wire formed into a grid mounted on a backing similarly to said first and second grids and mounted adjacent but at right angles to said second grid; lead wires attached to the end wires of said grids with the points of connection of said lead wires cemented to said backings; and electrical indicating means to which said leads are attached, the grids being connected in the electrical circuit so that the resistances of the grids arranged so that the lengths of wire lie in the direction of strain of the material under the action of pressure acting within said tube and transversely to the longitudinal axis of the tube are additive while the changes of the resistance of the grids arranged at right angles to said first mentioned grids cancel one another so that the reading of said electrical indicating means is a measure of the pressure in the tube substantially free from error due to changes in resistance caused by bending of the tube.

2. A pressure indicator for measuring pressure variations in a hollow body comprising: a length of tube having a portion of reduced wall thickness; means for connecting said tube to said body so that said tube is responsive to variations in pressure within said body; a length of fine resistance wire wound into a grid formed as a plurality of closely spaced parallel lengths of wire, each pair of wires forming at one end small loops at alternately opposite ends of the grid; a backing of thin non-conductive material to which the grid is cemented throughout its extent, the backing being cemented throughout its extent to the surface of said portion of reduced wall thickness of said tube so that the lengths of wire lie in the direction of strain of the material under the action of pressure acting within said portion of reduced wall thickness of said tube and transversely to the longitudinal axis of the tube; a second length of resistance wire formed into a grid cemented to a backing similarly to said first mentioned grid and similarly mounted, the grids being arranged on opposite sides of said portion of reduced wall thickness of said tube; a third length of fine resistance wire wound into a grid cemented to a backing similarly to said first mentioned grid and mounted on the portion of reduced wall thickness of said tube exterior surface adjacent but at right angles to said first mentioned grid; a fourth length of fine resistance wire formed into a grid mounted on a backing similar to said first and second grids and mounted adjacent but at right angles to said second grid; lead wires attached to the end wires of said grids with the points of connection of said lead wires cemented to said backings; and electrical indicating means to which said leads are attached, the grids being connected in the electrical circuit so that the resistances of the grids arranged so that the lengths of wire lie in the direction of strain of the material under the action of pressure acting within said portion of reduced wall thickness of said tube and transversely to the longitudinal axis of the tube are additive, while the changes of resistance of the grids arranged longitudinally of the axis of the portion of reduced wall thickness of said tube cancel one another, so that the reading of said electrical indicating means is an indication of the pressure in the system in which said tube is included substantially free from error due to changes in resistance caused by bending of said tube.

3. A pressure indicator for measuring pressure variations in a hollow body comprising: a length of tube having a portion thereof formed to yield or distort to a greater degree than said body under internal pressure; means for connecting said tube to said body so that the said tube is responsive to variations in pressure within said body; an electrical resistance type strain gauge secured throughout its extent to the surface of said tube so that said gauge extends in the direction of strain of the material of the tube under the action of pressure acting within said tube and transversely of the longitudinal axis of the same; lead wires attached to the strain gauge; and electrical means to which said leads are connected for indicating the change in resistance of the gauge due to variations in the peripheral dimension of said tube caused by variations of pressure within said tube.

4. A pressure indicator for measuring pressure variations in a hollow body comprising: a length of tube having a portion thereof formed to yield or distort to a greater degree than said body under internal pressure; means for connecting said tube to said body so that the said tube is responsive to variations in pressure within said body; an electrical resistance type strain gauge secured throughout its extent to the surface of said tube so that said gauge extends in the direction of the strain of the material of the tube under the action of the pressure acting within said tube and transversely of the longitudinal axis of the tube; a second electrical resistance type strain gauge secured to said tube at right angles to said first mentioned gauge; lead wires attached to said gauges; and electrical indicator means to which said leads are attached.

5. A pressure indicator for measuring pressure variations in a hollow body comprising: a length of tube having a portion of reduced wall thickness; means for connecting said tube to said body so that said tube is responsive to variations in pressure within said body; a length of fine resistance wire wound into a grid formed as a plurality of closely spaced parallel lengths of wire, each pair of wires forming at one end small loops at alternately opposite ends of the grid; a backing of thin non-conductive material to which the grid is cemented throughout its extent, the backing being cemented throughout its extent to the one side of said portion of reduced wall thickness of said tube so that the lengths of wire lie in the direction of strain of the material under the action of pressure acting within said portion of reduced wall thickness of said tube and transversely of the longitudinal axis thereof; a second length of resistance wire formed into a grid cemented to a backing similarly to said first mentioned grid; said second backing being mounted on the opposite side of said portion of reduced wall thickness of said tube; lead wires attached to the end wires of said grids with the points of connection of said lead wires cemented to said backings; and electrical means to which said leads are connected for indicating the change in resistance of said wire due to variations in the peripheral dimension of said portion of reduced wall thickness of said tube caused by variations of pressure within said hollow body.

RALPH H. OSTERGREN.

REFERENCES CITED

The following references are of record in the file of this patent:

Publication I, "Instruments," vol. 15, April 1942, pp. 112–114, 136 and 137.

Publication II, "Automotive and Aviation Industries," June 1, 1942, pp. 40–43.